US011339340B2

(12) United States Patent
Fisher et al.

(10) Patent No.: US 11,339,340 B2
(45) Date of Patent: May 24, 2022

(54) FLAVOR BRIQUET

(71) Applicant: THE CLOROX COMPANY, Oakland, CA (US)

(72) Inventors: Stephen S. Fisher, Pleasanton, CA (US); Greg Maier, Pleasanton, CA (US); Marcus Wang, Oakland, CA (US); Tarric M. El-Sayed, Pleasanton, CA (US); Michelle E. Claudnic, Pleasanton, CA (US); Calvin daRosa, Pleasanton, CA (US); Allison Gregg, Durham, NC (US); Jeremy Thuerk, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

(21) Appl. No.: 17/091,364

(22) Filed: Nov. 6, 2020

(65) Prior Publication Data

US 2021/0147758 A1    May 20, 2021

Related U.S. Application Data

(60) Provisional application No. 62/936,094, filed on Nov. 15, 2019.

(51) Int. Cl.
   *C10L 5/36*      (2006.01)
   *C10L 5/14*      (2006.01)
(52) U.S. Cl.
   CPC .................. *C10L 5/361* (2013.01); *C10L 5/14* (2013.01); *C10L 2230/10* (2013.01)
(58) Field of Classification Search
   CPC ......... C10L 5/361; C10L 5/14; C10L 2230/10
   See application file for complete search history.

(56) References Cited

U.S. PATENT DOCUMENTS 3,395,026 A * 7/1968 Gregory ................. A23B 4/044
                                                      426/650
3,709,700 A * 1/1973 Ross ......................... C10L 5/44
                                                      426/650
(Continued)

FOREIGN PATENT DOCUMENTS

BE       1024242 B1 *  1/2018    ................ C10L 5/14
EP       0368810 A1    5/1990
EP       0439373 A1 *  7/1991    ........... A61K 9/1652

OTHER PUBLICATIONS

The Clorox Company, Safety Data Sheet for "Kingsford Smokehouse Style Briquets—Hickory" Product, https://www.thecloroxcompany.com/wp-content/uploads/kingsfordoriginalcharcoalbriquetsjw2014-11-07.pdf, dated Jan. 5, 2015, 9 pages.

(Continued)

*Primary Examiner* — Pamela H Weiss
(74) *Attorney, Agent, or Firm* — Edell, Shapiro & Finnan, LLC

(57) ABSTRACT

A flavor or aroma charcoal material, such as charcoal briquets, which is formulated to include a flavor or aroma component. The charcoal material may include a smoldering agent (e.g., limestone), wood particles (e.g., sawdust), a binder, and the flavor or aroma component (herbs and/or spices). The flavor or aroma charcoal material may not be configured as a fuel charcoal material, for example, it may be substantially void of char and/or coal. In an embodiment, the flavor or aroma charcoal material may be provided as part of a blend of different charcoal materials that includes both flavor or aroma briquets in combination with fuel briquets (e.g., which fuel briquets include char and/or coal, while the flavor briquets do not). The flavor briquets provide enhanced aroma and/or flavor to the grilling experience.

9 Claims, 1 Drawing Sheet

(56) References Cited

U.S. PATENT DOCUMENTS

| | | | | |
|---|---|---|---|---|
| 4,167,398 A * | 9/1979 | Hughes | | C10L 5/10 44/553 |
| 4,787,914 A * | 11/1988 | Crace | | A23B 4/048 126/25 R |
| 4,857,074 A * | 8/1989 | Crace | | A23B 4/0526 44/540 |
| 4,874,396 A * | 10/1989 | McLeod | | A23B 4/0526 44/589 |
| 4,878,914 A * | 11/1989 | Miwa | | A61F 2/30767 623/23.56 |
| 4,941,889 A * | 7/1990 | Holmes | | A23B 4/044 44/545 |
| 5,421,836 A * | 6/1995 | Ross | | C10L 5/44 44/541 |
| 5,427,805 A * | 6/1995 | Crace | | C10L 5/40 426/314 |
| 6,273,922 B1 * | 8/2001 | Funk | | C10L 5/04 44/577 |
| 7,517,371 B2 | 4/2009 | Traeger et al. | | |
| 8,328,884 B1 | 12/2012 | Traeger et al. | | |
| 9,279,091 B2 * | 3/2016 | Stinson | | C10L 5/44 |
| 2006/0042618 A1 | 3/2006 | Gonzalez | | |
| 2009/0100751 A1 * | 4/2009 | Smith | | C10L 5/44 44/590 |
| 2011/0206809 A1 * | 8/2011 | Tate | | A23K 40/20 426/73 |
| 2013/0042521 A1 * | 2/2013 | Querrey | | C10L 5/442 44/530 |
| 2013/0067805 A1 * | 3/2013 | Geffen | | C10L 5/442 44/589 |
| 2015/0113868 A1 * | 4/2015 | Querrey | | C10L 9/10 44/590 |

OTHER PUBLICATIONS

Sangeeta Dwivedi, Palash Prajapati, Narendra Vyas, Sapna Malviya, Anil Kharia, "A Review on Food Preservation: Methods, harmful effects and better alternatives", Asian Journal of Pharmacy and Pharmacology 2017 pp. 193-199, 7 pages.

* cited by examiner

FLAVOR BRIQUET

CROSS-REFERENCE TO RELATED APPLICATIONS

This application claims the benefit of and priority to United States Provisional Patent Application No. 62/936,094 filed Nov. 15, 2019, which is herein incorporated by reference in its entirety.

BACKGROUND OF THE INVENTION

1. The Field of the Invention

The present invention relates to charcoal heating materials. Specifically, the invention relates to charcoal briquets or similar materials formulated to provide flavor and aroma to food, during grilling.

2. Background and Relevant Art

Charcoal heating materials, such as charcoal briquets, are commonly used for cooking food. Foods cooked with charcoal can have a unique flavor and have wide appeal. Conventional charcoal briquets generally provide a slow-burning fuel with a high BTU output.

While charcoal materials are available that provide a hickory or mesquite flavor or aroma, there continues to be a need and desire for additional alternatives.

BRIEF SUMMARY

The present disclosure is directed to charcoal materials for grilling food, the charcoal material comprising an inorganic smoldering agent (e.g., limestone), a binder, and an edible aroma or flavoring component. The edible aroma or flavoring component can comprise not simply wood particles (e.g., such as hickory or mesquite sawdust), but can comprise a mixture of spices and/or herbs that provides at least one of aroma or flavor while grilling food. In an embodiment, wood particles (e.g., sawdust), such as hickory, mesquite, apple wood, etc., may also be present. In an embodiment, such a flavor briquet or flavor charcoal material may actually be void, or substantially void, of char and/or coal. The present flavor briquets or flavor charcoal materials may therefore be provided not as a fuel material, but as a flavor material, for use with a typical fuel charcoal material.

While limestone has been used to some extent in charcoal briquets, it is typically paired with char and/or coal, as a whiteness enhancer. In the present embodiments, the limestone or another inorganic smoldering agent is included for an entirely different purpose, e.g., to decrease the combustion temperature of the flavor briquet or other flavor charcoal material, to enhance release of the flavor and/or aroma components into the food being grilled. In addition, the limestone may be present at far higher fractions in the briquet or other shaped material, as compared to use of limestone as a whiteness enhancer. For example, the limestone or other smoldering agent may be present in an amount of at least 30%, or at least 35%, such as about 50%, by weight.

Another embodiment is directed to a composition for forming briquets or another shaped material for use in adding at least one of aroma or flavor when grilling food. The composition comprises water and a mixture of dry components, where the dry components include a binder (e.g., from 2% to 15% by weight of the dry components of the composition), an inorganic smoldering agent (e.g., from 30% to 70% by weight of the dry components of the composition), and an edible aroma or flavoring component (e.g., from 10% to 30% by weight of the dry components of the composition). Wood particles (e.g., from 20% to 50% by weight of the dry components of the composition) may also be included. In an embodiment, the water and dry components may be provided in a weight ratio of from 0.15:1 to 0.55:1 (e.g., 15-35% water). Such a mixture of wet and dry components may be referred to as the "green" mix from which the briquets or other shaped material may be formed. Briquets or other shaped materials may be dried to reduce their moisture content, resulting in the desired finished flavor briquets or other flavor shaped charcoal materials.

Another embodiment is directed to a mixed charcoal blend for use in grilling food, the mixed charcoal blend comprising a blend of differently formulated charcoal briquets comprising fuel briquets and flavor briquets. The fuel briquets include at least one of char or coal and a binder. The fuel briquets may be substantially void of any edible aroma or flavoring components. The flavor briquets may include an inorganic smoldering agent, a binder; and an edible aroma or flavoring component. The flavor briquets may be substantially void of char and coal. The edible aroma or flavoring component may comprise a mixture of spices and/or herbs that releases at least one of aroma or flavor while grilling food. The two types of briquets can be provided in a suitable ratio of the two types, one to another, for example 1 to 10 flavor briquets for a pile (e.g., about 30 briquets) of fuel briquets.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present disclosure, a more particular description will be rendered by references to the appended drawings. The present disclosure will be described and explained with additional specificity and detail through the use of the accompanying drawings.

FIG. 2 also charts temperature data for the flavor briquets in option 2.

DETAILED DESCRIPTION

Definitions

Figure 1:
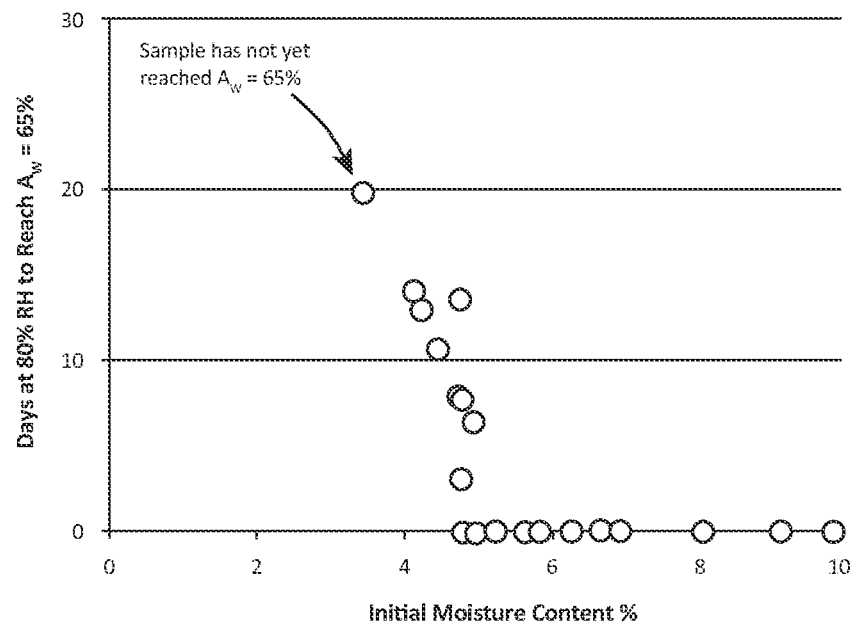
FIG. 1 charts the time required to reach 65% water activity for various exemplary flavor briquets, formed so as to have differing initial water content values, stored at 80% relative humidity and 80° F.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising," which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "smoldering agent" includes one, two or more such smoldering agents.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition. Unless otherwise specified, such amounts are on a dry basis (i.e., excluding water that may be added or otherwise present).

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Implementations of the present invention are described herein primarily with reference to "charcoal" materials such as "charcoal" briquets. While a fuel charcoal material (e.g., shaped as a briquet) normally includes char and/or coal as one might infer from the name, in the present invention, the flavor "charcoal" briquets as described herein typically include no char and no coal. Such flavor charcoal briquets are within the scope of the term "charcoal briquets" and "charcoal material", as used herein for convenience, even though they may not include any char or coal.

As used herein, a briquet refers to such a charcoal material that is sized and shaped for use as a combustible material for cooking. The size and weight of a briquet may vary widely. Typical charcoal briquet dimensions may range from about 2 cm by about 2 cm by about 1 cm (e.g., about 4 $cm^3$) to about 10 cm by about 10 cm by about 5 cm (e.g., 500 $cm^3$). The weight of such briquets may vary between less than 10 grams and about 1000 grams. A typical briquet may measure about 4.5 cm by about 3.8 cm by about 2.5 cm (e.g., about 40 $cm^3$) and weigh about 20 to about 40 grams. Exemplary briquets and charcoal materials are sold by Applicant under the trademark KINGSFORD, and an example of such briquets is shown in Applicant's U.S. Pat. No. D517,005, herein incorporated by reference in its entirety.

II. Introduction

The present disclosure is directed to charcoal materials for grilling food, which provide aroma or flavor characteristics during such grilling. While it is possible to simply add an edible aroma or flavoring component (e.g., herbs and/or spices) to a mixture of components used to form a typical fuel charcoal briquet that includes at least one of char or coal, the present inventors have discovered that the aroma or flavoring effect can be strengthened or enhanced by placing these aroma or flavoring components in briquets or other shaped charcoal materials that are specifically formulated for this particular purpose, rather than formulated principally as (or also as) a fuel charcoal material.

For example, a charcoal material according to the present disclosure can include an inorganic smoldering agent (e.g., to decrease the rate of combustion, lowering the temperature that the briquets combust at (i.e., more smoldering) to better release aroma and/or flavoring characteristics), a binder, and the aroma or flavoring component. Wood particles (e.g., sawdust) may optionally be present. In an embodiment, the aroma or flavoring component is something other than the typical hickory, mesquite, or other wood varieties sometimes included in charcoal materials to provide a signature aroma or flavor. For example, the aroma or flavoring component may be an edible herb or spice, or a mixture of such herbs and spices. As such, in at least one embodiment, the aroma or flavoring component is not merely wood particles (e.g., sawdust) from a hickory, mesquite, or other wood source.

The aroma or flavoring component may release a desired aroma, (e.g., into the grilling environment, to be enjoyed by those present) and/or flavor (e.g., becoming impregnated into the meat or other food being grilled, to be tasted by those consuming the grilled food). In an embodiment, the specially formulated flavor or aroma charcoal material includes substantially no char or coal, and is thus not principally formulated as a fuel material, but for the aroma and/or flavor characteristics that it will provide, e.g., when used in combination with a fuel charcoal material that does include one or both of char or coal.

For example, a mixed charcoal blend may be provided, which includes both fuel briquets and flavor briquets that provide aroma and/or flavor (referred to herein as "flavor briquets" for brevity). The fuel briquets may include char and/or coal, e.g., with a binder, while the flavor briquets are substantially void of char and coal, and may comprise an inorganic smoldering agent to decrease combustion temperature (increase smoldering and release of flavor/aroma), a binder, and an edible aroma or flavoring component (e.g., herbs and/or spices). Wood particles may also be present (e.g., within particularly the flavor briquets, but also optionally within the fuel briquets).

III. Components for the Flavor Briquets and Fuel Briquets

Typical briquets may assume various shapes, for example, generally rectangular, or may include one or more curved surfaces (e.g., top and bottom surfaces may be convexly curved outward). One will appreciate, however, that briquets are only one type of charcoal material which a user may form using the methods and compositions described herein. For example, a user can use implementations of the present disclosure to form not only briquets, but also logs, cubes, other geometric forms, or any other desired shape consistent with the intended use of the present charcoal products. It will be appreciated that the shape of the product is not particularly limited.

Regardless, implementations of the present invention can involve forming a charcoal material, such as a charcoal briquet, by combining dry components of a charcoal mixture with water, and pressing briquets or other desired shapes therefrom.

Fuel briquets may comprise traditional charcoal ingredients, while the flavor briquets may be formed from suitable components as described herein, but in at least an embodiment, include no char or coal.

Wood char, coal, a binder, an ignition aid, an oxidizer and the like are often used in formulating typical fuel charcoal briquets or other charcoal materials. "Wood char" or "char" refers to the hard fibrous substance that makes up the greater part of the stems, branches, and roots of trees or shrubs beneath the bark, which has been subjected to pyrolysis so as to convert the material to at least some extent to carbon. Thus, char is a comprehensive term, and includes retort chars, kiln chars, etc. As noted, in an embodiment, the fuel charcoal material (e.g., briquets) typically includes char, while the flavor briquets do not.

As used herein, the term "coal" refers to a solid combustible substance formed by the partial decomposition of vegetable matter without free access to air, under the influence of moisture, and often increased pressure and temperature. Furthermore, coal can include substances such as the foregoing either before or after partial burning and/or scorching in an oxygen-poor environment (or charring) such as might be carried out to remove undesirable components. One will appreciate, therefore, that coal can include various coal components, including but not limited to, anthracite, semi-anthracite, bitumen, mineral carbons, and mixtures of any of the foregoing, as well as any partially burned or scorched portions thereof, etc. As noted, in an embodiment, the fuel charcoal material (e.g., briquets) typically includes coal, while the flavor briquets do not.

The term "binder," as used herein, refers to materials that possess adhesive qualities that produce or promote the holding together of loosely aggregated particulate components. Binders can include, but are not limited to, starches derived from corn, milo, wheat, or other complex carbohydrates. As noted, in an embodiment, both the fuel charcoal material and the flavor briquets may include a binder.

The term "ignition aid," as used herein, refers to materials that are useful in the act or process of initiating combustion of a fuel or other component, such as a briquet. Thus, ignition aids can include, but are not limited to, sawdust, fines resulting from char production, other particulate cellulosic matter, solvents, aliphatic and petroleum hydrocarbons, and mixtures and blends thereof. A significant sawdust component (e.g., wood particles) may typically be present in the flavor charcoal material (e.g., briquet). While such wood particles may be present in the flavor briquets, such may be present more for flavor/aroma purposes, than as an ignition aid.

As used herein, the term "oxidizer" refers to any material or component which can effectively increase the supply of oxygen to combustible ingredients, such as a nitrate. Such nitrates or other oxidizers may optionally be present in either of the fuel charcoal materials (briquets) or flavor charcoal materials (briquets). In an embodiment, in order to further decrease combustion rate and lower combustion temperature (i.e., more smoldering) of the flavor charcoal briquets, neither the fuel briquets, nor the flavor briquets may include such an oxidizer.

Other ingredients may also be present in either type of briquet. For example, a release agent such as Borax (sodium tetraborate) may be present, which can aid in releasing the charcoal material from a roll press or the like, during manufacture.

While limestone is sometimes included in fuel charcoal materials as a whiteness enhancer, the present embodiments include limestone or another inorganic smoldering agent within the flavor briquets for an entirely different purpose. The smoldering agent may decrease combustion rate and lower combustion temperature causing the flavor briquets to smolder as they are combusted, surrounded by fuel briquets in a pile of charcoal briquets, where a fraction of the briquets are flavor briquets, and the other briquets (e.g., a vast majority, typically) are fuel briquets. The inorganic smoldering agent is included in a relatively high concentration within the flavor charcoal material, e.g., typically at least 30%, at least 35%, at least 40%, or at least 45% by weight. By way of example, the smoldering agent may be present in an amount from 30% to 70%, or from 40% to 60% (e.g., about 50%) by weight. In an embodiment, the inorganic smoldering agent may be present at a higher weight fraction than any other material included in the mixture of materials from which the flavor briquets are made. Such inorganic smoldering agents are non-combustible, providing substantially no BTU heating value, but serve to slow down the combustion of those components included in the flavor briquet that are combustible, such as the wood particle "sawdust" component, and the edible aroma or flavoring component (e.g., herbs and/or spices). In an embodiment, other than the smoldering agent, the wood particles, and the aroma or flavoring component, no other component accounts for 25%, 20%, 15%, 10%, or even 5% by weight of the mixture. Thus, in at least one embodiment, the flavor briquets are not fuel briquets, as they do not include significant fractions of high BTU combustible materials (e.g., with a BTU value higher than sawdust), but include materials specifically selected for other purposes.

The aroma or flavoring component (e.g., herbs and/or spices) may be present in an amount of at least 10%, at least 15%, or at least 20% (e.g., from 15% to 40%) by weight of the mixture of components in the flavor briquet. As mentioned herein, there may be substantially no char and/or no coal present. A small fraction of release agent may be present (e.g., typically less than 1%), as well as a binder which may be present from 1 to 15%, from 2 to 10%, from 3 to 9%, or from 3% to 7% by weight. It will thus be appreciated that the smoldering agent, the wood particles, and the aroma or flavoring component may thus account for at least 90%, or at least 95% by weight of the components included in the flavor briquet.

The wood particles may comprise any wood species, although hickory, mesquite, apple, or other edible fruit or nut bearing varieties may be preferred. Such wood particles may be relatively small (e.g., average particle sizes of less than 3 mm, less than 2 mm, or less than 1 mm (e.g., sawdust). The wood particles may be included in an amount ranging from 10% to 70%, from 15% to 60%, from 20% to 50%, from 20% to 40%, or from 20% to 30% by weight of the dry components of the flavor charcoal material. While wood particles may sometimes be present in the fuel charcoal material, where present in such, they are typically included as an ignition aid, and are typically present in a reduced amount (e.g., no more than 15%, no more than 10%, or no more than 5% by weight, in such a fuel charcoal component).

The aroma or flavoring component may comprise any one of or a blend of various herbs or spices, such as, but not limited to garlic, onion, oregano, parsley, thyme, paprika, chili pepper, other peppers, cumin, basil, sage, essential oils of such herbs or spices (e.g., garlic oil, onion oil, rosemary oil), concentrated flavors such as dried (e.g., freeze dried) forms of garlic, barbeque seasoning, lemon pepper, spicy southwestern, and the like. It will be appreciated that the aroma or flavoring component is not particularly limited.

In addition to limestone, other non-limiting examples of inorganic smoldering agents include, but are not limited to perlite, zeolite, expanded shale, sodium bentonite, other clays, and the like (e.g., non-combustible minerals). The smoldering agent serves to decrease combustion rate and lower combustion temperature.

Flavor briquets may be provided separately, or packaged with fuel briquets. Where packaged together, or when used together, the weight ratio of fuel briquets to flavor briquets may range from 1:1 to 50:1, from 2:1 to 40:1 or from 3:1 to 20:1. For example, during use, one may add 3-10 flavor briquets to a typical pile of fuel briquets (e.g., about 30 briquets total). Such ratios may also refer to number ratios (i.e., number of fuel briquets to number of flavor briquets).

In an embodiment, the smoldering component is included in the flavor briquet in such a manner that the flavor briquet disintegrates as it combusts, with the fuel briquets it is used with. Flavor briquets could also be provided for use with a gas or electric grill, e.g., where the flavor briquet(s) are provided with an enclosure configured to retain ash that results as the flavor briquet disintegrates during combustion. Such a disintegrating structure is differentiated over that described in U.S. Pat. No. 4,787,914, where a clay carrier matrix of the briquet is provided which remains intact, so that there is substantially no disintegration. In the present invention, either the flavor briquet disintegrates along with fuel briquets that are being combusted along with the flavor briquet in grilling, or if used with a gas or electric grill, the flavor briquet is provided in an enclosure provided with the briquet, which enclosure (e.g., an aluminum or other metal foil) collects the ash resulting from disintegration. The flavor briquets may thus be formed in a similar pressing operation as the fuel briquets, where dry components of the charcoal material are mixed with water, and pressed in a roll press, extruded, cast, or otherwise formed.

Notwithstanding the foregoing, the flavor briquets may keep their shape better than fuel briquets during combustion due to the presence of significant fractions of the smoldering agent in the flavor briquets. While some disintegration will typically occur in the flavor briquets during combustion, their level of disintegration may be significantly less than what occurs in the standard fuel briquets.

With respect to the fuel briquets, they have a significantly different composition as compared to the flavor briquets, as they include substantial quantities of char and/or coal. By way of example, the amount of char and/or coal in a typical fuel briquet may range from 25% to 85%, from 30% to 80%, or from 40% to 80% by weight of the composition.

The binder present in flavor and fuel briquets may typically range from 1% to 15%, from 2% to 10%, or from 3 to 9% by weight of the composition.

It should be noted that the percents by weight discussed herein generally exclude water (e.g., they are on a dry basis). Water is typically mixed with the dry components to form an aqueous "green" mixture from which briquets can be pressed to form the final dried charcoal briquets. By way of example, a weight ratio of water to dry components when forming either type of briquet (flavor or fuel) may range from 0.07:1 to 0.55:1, or from 0.15:1 to 0.55:1. For example, water content in the "green mix" may range from 15-35% by weight of the mixture. Briquets or other shaped charcoal materials may be formed by introducing such a green mixture into a roll press, an extruder, or by simply pouring the mixture into molds followed by curing. After drying, the briquets will exhibit lower water content than in the green mix, e.g., 10% moisture or less. Even lower water content values may be advantageous, as described below, to inhibit mold growth on the exterior surface of particularly the flavor briquets.

One important characteristic of the presently claimed charcoal materials is the concept of providing a flavor briquet that differs from a fuel briquet, where the fuel briquet includes char and/or coal, while the flavor briquet may be void or substantially void of such high BTU components. Applicant has found that providing separate flavor and fuel briquets, and mixing the two types of briquets for use at the time of cooking provides enhanced flavor/aroma delivery to the food being grilled with such charcoal materials. The present charcoal materials, mixtures of charcoal materials and methods act to slow down the combustion rate, lower the combustion temperature, and create an environment that leads to more smoldering, rather than just increasing combustion time or the length of the burn. For example, the flavor briquets may effectively be characterized as similar to standard fuel briquets, but where the high BTU carbon sources (char, coal) are removed, and replaced with (i) spices or other edible aroma/flavor component and (ii) the inorganic smoldering agent, such as limestone.

In at least one embodiment, an important feature is the concentration of the spices or other aroma/flavor component in a flavor briquet separate from the fuel briquets, and the addition of substantial limestone or other smoldering agent content to the flavor briquets to decrease the combustion rate (i.e. combusting at a lower temperature). By driving less complete combustion (also referred to as smoldering), the present embodiments enhance the flavor experience by combusting at a lower temperature and concentrating the flavor release over the grilling time period of importance to the consumer.

This configuration with distinct flavor briquets and distinct fuel briquets in the briquet pile being combusted results in significant advantages over simply including the spice or other flavor/aroma component spread evenly amongst all the briquets. In particular, such a scenario exhibits higher overall combustion temperature. As a result, spices or other flavor/aroma components are combusted more completely and quickly, leading to a faster and more complete breakdown of the flavor/aroma components, before such components have any real opportunity to flavor the food being grilled. At its highest level, complete combustion breaks everything down to $CO_2$ and $H_2O$. By facilitating less complete combustion (smoldering), the breakdown of flavor/aroma components is more limited, and the time period over which the flavor/aroma components can impregnate and flavor the food is extended.

Data is provided in the Examples section below, showing how providing distinct flavor briquets for use with distinct fuel briquets results in lower combustion temperature as compared to a scenario where the same amount of flavor/aroma component is simply mixed into all fuel briquets.

As noted above, as the flavor briquets include significant fractions of food source components that are capable of supporting mold growth (i.e., the spices and/or sawdust), they may exhibit an undesirable tendency to exhibit growth of mold on an exterior surface of such flavor briquets. In order for mold growth to occur, four main conditions are required. These conditions are available mold spores, available mold food, appropriate temperature range, and sufficient moisture. Mold spores are ubiquitous and may be difficult to eliminate, as a practical matter. That said, their concentration may be reduced by making particular selections during the manufacturing process. By way of example, the drying step for drying the formed flavor briquets can be used to significantly reduce the concentration of viable mold spores. For example, during manufacture, the flavor briquets may be dried to significantly lower moisture content than the fuel briquets, and significantly lower moisture content than is typically achieved in charcoal materials generally.

While the mold food (the spice and/or wood particle components) present in the flavor briquets cannot be removed as they are necessary to achieving the desired aroma/flavor enhancements described herein, various additional levers are available to minimize or prevent undesirable mold growth on the flavor briquets.

As described above, one lever available in the manufacturing process is the initial drying conditions (i.e., the level to which the briquets formed from the "green mix" are dried, following briquet formation from the green mix. By way of example, in an embodiment, the flavor and/or associated fuel briquets may be dried to a moisture content of less than 10%, less than 9%, less than 8%, less than 7%, less than 6%, less than 5%, less than 4%, less than 4.5%, or less than 4%, (e.g., about 3% or less), less than 3%, less than 2%, or less than 1% by weight. Such reduced moisture content aids in reducing or eliminating undesirable mold growth. The goal of such processing or other adjustments is to prevent mycelium growth by delaying and/or extending the germination process. Each mold species has a minimum humidity at which germination can begin. For mold species that may typically be present within dry mix components of the flavor briquets as described herein, this lower limit may typically be at about 70 to 75% relative humidity, although at such threshold conditions germination may take several months or longer. Germination rate accelerates exponentially as humidity increases.

Mold levels can be measured using standard techniques (e.g., by a third party lab). By way of example, a typical average Colony Forming Unit ("CFU") level for a dry mix as described herein may be about 100,000±200,000 CFU. As noted above, the initial drying step can be very effective at killing mold spores, e.g., reducing the CFU level in dried flavor briquets to no more than about 1000, 500, 300, 200, or 100 CFU.

In addition, Applicant has found that the initial moisture that the briquets are dried to significantly affects how long it will take the briquets to absorb enough moisture from their environment to support mold growth. Water activity is actually a more accurate measure of how much moisture within a material is "available" for mold to use for growth. Water activity often correlates to relative humidity, but it is more appropriate to describe mold growth in terms of water activity, rather than just relative humidity. The most drought resistant molds require a water activity of 65% for the germination process to begin and at this low water activity, germination will proceed very slowly. FIG. 1 shows the length of storage duration at 80% relative humidity needed for a flavor briquet to reach a water activity of 65%. FIG. 1 also shows how drying the briquets to relatively lower moisture content significantly increases the time it takes the briquet to reach that threshold level of 65% water activity. Specifically, when the briquets are dried to ~4.5% or less moisture content, a significant delay will be provided, before mold growth can even occur. Such delay is greatly increased as initial moisture levels drop to no more than 4%, no more than 3.5%, or no more than 3% by weight. Thus, in an embodiment, moisture content of the finished briquets (particularly the flavor briquets, although such could also apply to any fuel briquets packaged therewith) may be less than 4.5%, less than 4%, or less than 3%, such as 1-4%, or 2-4% moisture content. Such is significantly below the moisture content of typical fuel briquets.

In addition or alternative to adjusting such processing conditions (and the resulting moisture content of at least the finished flavor briquets), it is also possible to add a preservative to the formulation, to inhibit germination of mold spores, preventing or minimizing mycelium growth on the flavor briquets. By way of example, a preservative such as a sorbate (e.g., potassium sorbate), benzoate, or other preservative may be included in the green mix composition from which the briquets are formed. MicroGARD is another example of a preservative that may be suitable for use. MicroGARD is available from DANISCO, and includes fermentation metabolites of diary cultures, which inhibit various bacteria and molds (including yeasts), as described in U.S. Pat. Nos. 5,096,718; 5,260,061; and 5,653,484, each of which is herein incorporated by reference in its entirety. Any such preservative may be present in a relatively small amount, e.g., less than 5%, less than 4%, less than 3%, less than 2%, such as about 1% or less. Applicant has also interestingly observed that simply blending the flavor briquets with regular fuel briquets can also actually reduce or delay growth of mold on the surface of the flavor briquets, as compared to the same flavor briquet stored under the same conditions, but not mixed with the fuel briquets. Further details illustrating such are included in the Examples section below.

EXAMPLES

Example 1

| Component | wt % |
| --- | --- |
| Char | 45% |
| Coal | 36.1% |
| Limestone | 4% |
| Sawdust | 2% |
| Flavor | 3% |
| Starch | 8.5% |
| Nitrate | 1% |
| Borax | 0.4% |

The sawdust included hickory and/or mesquite wood particles. The flavor component included a mix of Italian herbs, seasoned salt, thyme, and "Montreal Steak Seasoning". It was observed that the flavor briquets provide a pleasant spicy/herb aroma both before and after drying (somewhat decreased after drying). Combusting the briquets produced notable spicy/herb aroma characteristics. Chicken cooked on these briquets exhibited a slight flavor transferred from the flavor component in the flavor briquets to the chicken. It was found that providing the flavor in specially formulated flavor briquets provided enhanced aroma and flavor, as compared to including the flavor components in the fuel briquet formulation, compared to as shown above, in Example 1.

Example 2

Flavor briquets similar to those described in Example 1 were prepared, except the flavor used was French onion seasoning, and garlic and herb seasoning. Similar results were observed.

Example 3

Specially formulated flavor briquets were prepared in a manner similar to those described in the Examples above, except they included no char or coal. They were formed from 40% sawdust, 10% starch, and 50% flavor. These were pressed in a Carver press, and added to a pile of KINGS-FORD standard fuel briquets. The result was enhanced aroma during grilling, and enhanced flavor to the food being grilled.

Example 4

| Component | wt % |
| --- | --- |
| Char | 0% |
| Coal | 15.4% |
| Limestone | 30% |
| Hickory Sawdust | 14% |
| Other Sawdust | 14% |
| Flavor | 14% |
| Starch | 12% |
| Nitrate | 0% |
| Borax | 0.6% |

The resulting flavor briquets were also coated with the flavor mix, after being formed.

Example 5

| Component | wt % |
| --- | --- |
| Char | 0% |
| Coal | 0% |
| Limestone | 29.4% |
| Hickory Sawdust | 15% |
| Other Sawdust | 15% |
| Flavor | 30% |
| Starch | 10% |
| Nitrate | 0% |
| Borax | 0.6% |

TABLE 1

Examples 6-12

| | Example | | | | | | |
| --- | --- | --- | --- | --- | --- | --- | --- |
| | 6 (Rosemary) | 7 (Onion) | 8 (Rosemary) | 8 (Onion) | 9 (Korean BBQ) | 10 (Chipotle) | 11 (Chili) |
| Char % | 0 | 0 | 0 | 0 | 0 | 0 | 0 |
| Coal % | 0 | 0 | 0 | 0 | 0 | 0 | 0 |
| Limestone % | 46.4 | 46.4 | 46.4 | 46.4 | 45.5 | 45.5 | 43.5 |
| Sawdust % | 30 | 30 | 20 | 30 | 29 | 29 | 29 |
| Flavor % | 20 | 20 | 30 | 20 | 20 | 20 | 20 |
| Starch % | 3 | 3 | 3 | 3 | 5 | 5 | 7 |
| Nitrate % | 0 | 0 | 0 | 0 | 0 | 0 | 0 |
| Borax % | 0.6 | 0.6 | 0.6 | 0.6 | 0.5 | 0.5 | 0.5 |

Examples 6-12 were prepared in a similar manner as the examples described above. The flavors for each were, respectively, rosemary, onion, rosemary, onion, Korean BBQ, Chipotle, and mesquite with chili and cumin. The batches included 17% water, and 83% dry materials.

TABLE 2

Examples 13-15

| | Example | | |
|---|---|---|---|
| | 13 (Garlic, Onion, Paprika) | 14 (Chili Pepper, Cumin) | 15 (Basil, Sage, Thyme) |
| Char % | 0 | 0 | 0 |
| Coal % | 0 | 0 | 0 |
| Limestone % | 50 | 50 | 50 |
| Sawdust % | 25 | 25 | 25 |
| Flavor % | 20 | 20 | 20 |
| Starch % | 4.5 | 4.5 | 4.5 |
| Nitrate % | 0 | 0 | 0 |
| Borax % | 0.5 | 0.5 | 0.5 |

Examples 13-15 were prepared in a similar manner as the various examples described above. These examples similarly included no char or coal, with 50% limestone, 25% sawdust (e.g., hickory and/or mesquite), with 20% flavor component as noted, 4.5% starch, and 0.5% borax as a release agent. With at least some flavor briquets, it was observed that at least some of the flavor briquets exhibited mold growth over time, when stored under humid conditions, which is undesirable. Such can be minimized or prevented by addition of a small amount (e.g., 0.2 to 1%) of potassium sorbate or other preservative into the flavor briquets, and/or by ensuring the finished briquets are sufficiently dried.

The examples below were conducted to better understand how moisture content and/or inclusion of a preservative affects mold growth.

Examples 16-18

All briquets were stored at 80% relative humidity and 80° F., which is a stress test, as such conditions are higher humidity than the annual average humidity of the most humid city in the U.S., New Orleans. All briquets were dried down to an initial moisture of >9% (e.g., 9.1-15%), which is high enough for the germination process to begin immediately, effectively resulting in an accelerated test. The product with no preservative (Example 16) began molding after 15 days in storage. The product with 1% preservative (Example 17) and the product that has been blended with fuel briquets (Example 18) both exhibited no mold after 6 weeks, and they are expected to continue to show no mold growth for significantly longer. The Example 18 flavor briquets were mixed with fuel briquets at a 4:1 ratio (4 fuel briquets to 1 flavor briquet). The composition of the flavor briquets in Examples 16-18 was similar to those of Examples 13-15 (other than the presence of the 1% preservative in Example 17).

Examples 19-40

TABLE 3

| Example | Preservative & Percent | Moisture (%) | Days until Mold | Spice Blend |
|---|---|---|---|---|
| 19 | None | 9.2 | 15 | GOP |
| 20 | None | 6.7 | 65 | GOP |
| 21 | None | 6.3 | 38 | GOP |
| 22 | None | 5.7 | — | GOP |
| 23 | None | 5.3 | 65 | GOP |
| 24 | None | 4.8 | — | GOP |
| 25 | None | 4.8 | — | BST |
| 26 | None | 4.5 | — | GOP |

TABLE 3-continued

| Example | Preservative & Percent | Moisture (%) | Days until Mold | Spice Blend |
|---|---|---|---|---|
| 27 | None | 4.5 | — | CC |
| 28 | None | 3.8 | — | BWF-GOP |
| 29 | None | 3.7 | — | BWF-BST |
| 30 | None | 3.3 | — | BWF-CC |
| 31 | Sorbate (0.3%) | 5 | — | GOP |
| 32 | Sorbate (0.3%) | 4.3 | — | GOP |
| 33 | Sorbate (1%) | 9.9 | — | GOP |
| 34 | Sorbate (1%) | 7 | — | GOP |
| 35 | Sorbate (1%) | 5.9 | — | GOP |
| 36 | Sorbate (1%) | 5.7 | — | CC |
| 37 | Sorbate (1%) | 5 | — | GOP |
| 38 | Sorbate (1%) | 4.2 | — | BST |
| 39 | Sorbate (2%) | 9.7 | — | GOP |
| 40 | Sorbate (2%) | 5.2 | — | GOP |
| 41 | Sorbate (2%) | 3.4 | — | GOP |
| 42 | Sorbate (3%) | 8.8 | — | GOP |
| 43 | Sorbate (3%) | 6 | — | GOP |
| 44 | Sorbate (3%) | 3.5 | — | GOP |

*GOP = Garlic, Onion, Paprika
*BST = Basil, Sage, Thyme
*CC = Chili Pepper, Cumin
*BWF = BBQ Wood Flavor The 26 Examples (19-44) were stored at 80% relative humidity and 80° F. None of these 26 samples were blended with fuel briquets. After 65 days, only 4 of the examples had exhibited mold growth. These 4 examples (19-21 and 23) included no preservative and were only dried down to relatively high initial moisture values. Further observation of Examples 19-44, as well as additional Examples that were blended with fuel briquets and stored under similar conditions, continues.

Example 45

The objective of this example was to generate temperature data to show that using distinct flavor briquets mixed with distinct fuel briquets, as described herein, slows the rate of combustion, leading to a lower pile temperature than if the spices or other flavor/aroma components were mixed directly into the fuel briquets. The lower pile temperature was observed to limit the breakdown of flavor/aroma compounds, leading to an enhanced flavor experience to food grilled using such briquets.

Methodology for Testing—IR Temperature Detection

Three pounds of charcoal were lit with the aid of lighter fluid, and the temperature was recorded with an IR camera, at a rate of one frame every 6 seconds. By selecting different areas of the camera image, the average temperature of the entire pile of charcoal and the temperature of each individual flavor briquet was determined for each frame. The temperatures of all flavor briquets were then averaged together in order to calculate the average Flavor Briquet temperature for each camera frame.

Products Tested

Two different product options were evaluated:
(1) Spiced fuel briquets with 4% by weight of spices mixed directly into each briquet (i.e., a homogenous pile of only 1 type of briquet);
(2) A mixture of 80% fuel briquets and 20% flavor briquets (4:1 mix of 2 distinctly different types of briquets);

The flavor briquets under option (2) had 20% spice included in them (e.g., similar to Examples 13-15), so that the total overall spice level is the same between option 1 and option 2, the difference being that the spices under option (2) are concentrated in the flavor briquet, rather than being uniformly distributed through each briquet in the pile.

The formulas for the three types of briquets used in options (1) and (2) noted above are shown below in Table 4.

TABLE 4

|  | Fuel Briquet | Fuel Briquet With Spices | Flavor Briquet |
| --- | --- | --- | --- |
| Char % | 53.8 | 51.4 | 0 |
| Coal % | 20.5 | 19.6 | 0 |
| Limestone % | 15.7 | 15 | 50 |
| Sawdust % | 0 | 0 | 25 |
| Flavor % | 0 | 4 | 20 |
| Starch % | 9.5 | 9.5 | 4.5 |
| Nitrate % | 0 | 0 | 0 |
| Borax % | 0.5 | 0.5 | 0.5 |

Figure 2:
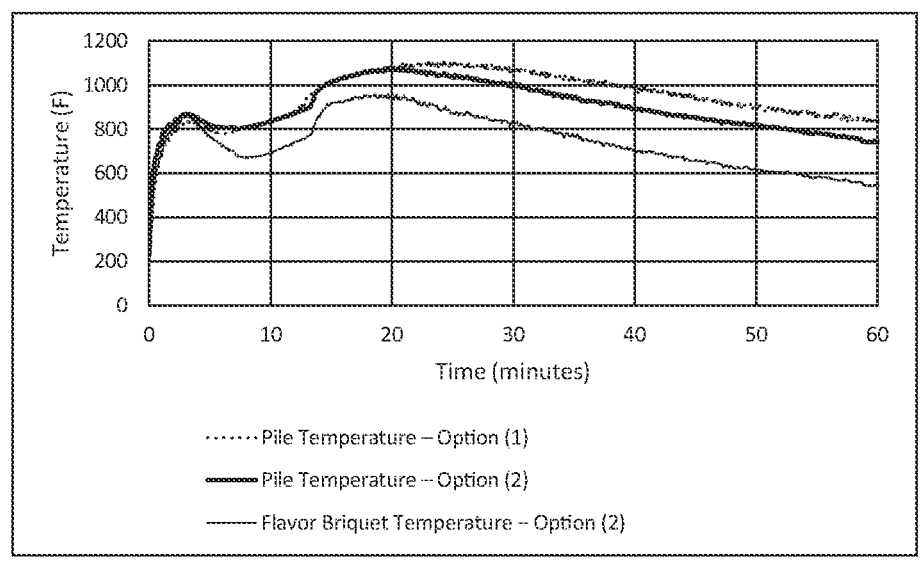
FIG. 2 charts temperature data for a charcoal briquet pile in which a flavor component is spread evenly across all briquets (option 1), as compared to temperature data for a comparative pile in which the flavor component is provided in distinct, separate flavor briquets, mixed with fuel briquets (option 2).

FIG. 2 illustrates the impact of placing the spices into a distinct, differently formulated flavor briquet. Option (1) combusts more completely, leading to a higher overall pile temperature throughout the length of the burn. Conversely, option (2) burns at a lower overall pile temperature. In particular, FIG. 2 shows that while the initial ignition phase (e.g., ~first 20 minutes) shows little difference between the two options, there is a significant difference in pile temperature during the critical phase from about 25 minutes after ignition and onward, when cooking actually occurs (e.g., from about 25 minutes to 60 minutes after ignition). Such difference in pile temperature is not insignificant, e.g., being from about 50-200° F., or from about 75 to 150° F. The significantly cooler pile temperature afforded by option (2) results in enhanced flavor delivery from the flavor briquets to the food being grilled, as the flavor and/or aroma components are not combusted as quickly or completely under option 2, allowing such components to better deliver flavor and/or aroma enhancement to the food being grilled.

FIG. 2 also shows the specific temperature of the flavor briquets themselves, which are included in the pile of option (2). As FIG. 2 shows, the flavor briquets burned at an even lower temperature than the overall pile temperature. For example, while the pile temperature in option (2) during the cooking phase may be from about 750 to 1000° F., the flavor briquets may be from about 550 to about 900° F. during the cooking phase. As shown in FIG. 2, the temperature of the flavor briquets may be about 200° F. cooler than the overall pile temperature. The overall lower temperature of the flavor briquets is driven by the formulation of the flavor briquets described herein. In particular, the significant limestone or other smoldering agent content acts as a combustion inhibitor, lowering the temperature of the flavor briquets, thereby driving a differentiated flavor experience in the food grilled on such a pile, compared to the pile of option (1). The data of FIG. 2 is based on two replicates.

Without departing from the spirit and scope of the invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A flavor briquet for grilling food, the briquet comprising:
    30% to 70% by weight of limestone;
    1% to 5% by weight of a preservative;
    a binder; and
    10% to 30% by weight of an aroma or flavoring component;
    wherein the aroma or flavoring component comprises a mixture of spices and/or herbs that provides at least one of aroma or flavor while grilling food; and
    wherein the briquet is substantially free of char and coal.

2. The flavor briquet of claim 1, wherein the binder comprises a starch.

3. The flavor briquet of claim 1, further comprising wood particles.

4. The flavor briquet of claim 1, further comprising borax, and wherein the flavor briquet is void of a nitrate ignition aid.

5. The flavor briquet of claim 1, wherein the binder comprises from 3% to 7% by weight of the briquet.

6. The flavor briquet of claim 3, wherein the wood particles are sawdust.

7. The flavor briquet of claim 3, wherein the wood particles comprise from 20% to 50% by weight of the briquet.

8. The flavor briquet of claim 1, wherein the preservative is selected from the group consisting of sorbate and benzoate.

9. The flavor briquet of claim 1, wherein the preservative is from 2% to 5% by weight of the briquet.

* * * * *